United States Patent
Chandra et al.

(10) Patent No.: US 11,297,065 B2
(45) Date of Patent: Apr. 5, 2022

(54) TECHNOLOGY FOR COMPUTING RESOURCE LIAISON

(71) Applicant: International Business Machines Corporation, Armonk, NY (US)

(72) Inventors: Dusi Sarath Chandra, Bangalore (IN); Sulakshan Vajipayajula, Bangalore (IN); Sreekanth Ramakrishna Iyer, Bangalore Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 16/672,407

(22) Filed: Nov. 1, 2019

(65) Prior Publication Data
US 2021/0136079 A1    May 6, 2021

(51) Int. Cl.
*H04L 29/00* (2006.01)
*H04L 29/06* (2006.01)

(52) U.S. Cl.
CPC .......... *H04L 63/102* (2013.01); *H04L 63/062* (2013.01); *H04L 63/083* (2013.01)

(58) Field of Classification Search
CPC ............... H04W 12/068; H04L 63/083; H04L 63/0884; H04L 63/062; H04L 63/102
See application file for complete search history.

(56) References Cited

U.S. PATENT DOCUMENTS

| | | | | |
|---|---|---|---|---|
| 8,789,147 | B1* | 7/2014 | Agarwal | H04L 63/0815 726/4 |
| 8,799,641 | B1* | 8/2014 | Seidenberg | H04L 63/08 713/153 |
| 9,078,128 | B2* | 7/2015 | Medina | H04W 12/069 |
| 9,215,223 | B2* | 12/2015 | Kirsch | H04L 63/06 |
| 9,491,155 | B1* | 11/2016 | Johansson | G06F 21/604 |
| 9,503,452 | B1* | 11/2016 | Kumar | H04L 67/306 |
| 9,954,763 | B1* | 4/2018 | Ye | H04L 41/0813 |
| 10,217,145 | B1* | 2/2019 | Ye | H04L 43/0876 |
| 10,798,545 | B2* | 10/2020 | Canavor | H04W 4/50 |
| 10,904,233 | B2* | 1/2021 | Roth | G06F 21/31 |

(Continued)

OTHER PUBLICATIONS

"The NIST Definition of Cloud Computing," NIST Special Publication 800-145, National Institute of Standards and Technology, http://csrc.nist.gov/groups/SNS/cloud-computing/index.html, Sep. 28, 2011.

*Primary Examiner* — Don G Zhao
(74) *Attorney, Agent, or Firm* — Anthony V. S. England; Jeffrey S. LaBaw; Susan M. Maze

(57) ABSTRACT

For providing computing resources to a user a liaison service initializes communication for first and second computing resources for the user. The liaison services communicate between the user and the computing resources. The communicating authenticates respective requests by the user for the respective first and second computing resources. Initializing the first and second computing resource services for the user by the liaison service includes providing, to the user via the liaison service, respective first and second account identifiers for the respective first and second computing resource services and includes storing in association with the first and second account identifiers, by the liaison service in a user password vault, respective first and second computing resource key identifiers.

15 Claims, 7 Drawing Sheets

(56) References Cited

U.S. PATENT DOCUMENTS

| | | | |
|---|---|---|---|
| 2004/0039701 A1* | 2/2004 | Nakamura | G06Q 20/10 705/42 |
| 2004/0128240 A1* | 7/2004 | Yusin | G06Q 20/10 705/39 |
| 2008/0030245 A1* | 2/2008 | Elrod | G06F 1/24 327/143 |
| 2008/0155323 A1* | 6/2008 | Hogan | G06F 11/1489 714/22 |
| 2009/0217298 A1* | 8/2009 | Circello | G06F 9/268 719/318 |
| 2009/0222656 A1* | 9/2009 | Rouskov | H04L 9/0825 713/155 |
| 2009/0222900 A1* | 9/2009 | Benaloh | H04L 9/3236 726/9 |
| 2009/0260072 A1* | 10/2009 | Rouskov | H04L 63/0807 726/9 |
| 2010/0132019 A1* | 5/2010 | Hardt | H04L 63/102 726/6 |
| 2011/0167153 A1* | 7/2011 | Maes | H04L 67/2819 709/224 |
| 2011/0314289 A1* | 12/2011 | Horn | H04L 9/0816 713/175 |
| 2012/0214444 A1* | 8/2012 | McBride | H04W 12/068 455/411 |
| 2014/0164126 A1* | 6/2014 | Nicholas | G06Q 30/08 705/14.58 |
| 2014/0245389 A1* | 8/2014 | Oberheide | H04L 63/0884 726/3 |
| 2014/0256425 A1* | 9/2014 | Flaherty | G07F 17/3244 463/29 |
| 2014/0297438 A1* | 10/2014 | Dua | G06Q 20/32 705/21 |
| 2015/0151131 A1* | 6/2015 | Huelskamp | G16H 40/40 607/59 |
| 2016/0007195 A1* | 1/2016 | Goldstone | H04W 12/068 455/411 |
| 2017/0163418 A1* | 6/2017 | Lanc | H04L 63/20 |
| 2017/0331808 A1* | 11/2017 | Roth | G06F 21/45 |
| 2017/0359345 A1* | 12/2017 | Gangadharan | H04L 63/0281 |
| 2017/0359346 A1* | 12/2017 | Parab | H04L 63/104 |
| 2018/0063143 A1* | 3/2018 | Wilson | H04L 67/32 |
| 2018/0083977 A1* | 3/2018 | Murugesan | G06F 16/27 |
| 2018/0255419 A1* | 9/2018 | Canavor | H04L 63/083 |
| 2019/0149592 A1* | 5/2019 | Lander | H04L 63/0815 726/4 |
| 2020/0186520 A1* | 6/2020 | Oberheide | G06Q 20/356 |

\* cited by examiner

TECHNOLOGY FOR COMPUTING RESOURCE LIAISON

BACKGROUND

Computing resource computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

SUMMARY

In an embodiment of the present invention, providing computing resources to a user includes initializing, for the user by a liaison service, communication for first and second computing resource services. The liaison service communicates between the user and the computing resource services. The communicating authenticates respective requests by the user for the respective first and second computing resource services. Initializing the first and second computing resource services for the user by the liaison service includes providing, to the user via the liaison service, respective first and second account identifiers for the respective first and second computing resource services and includes storing in association with the first and second account identifiers, by the liaison service in a user password vault, respective first and second computing resource key identifiers.

In other embodiments of the invention, other forms are provided, including a system and a computer program product.

DETAILED DESCRIPTION

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
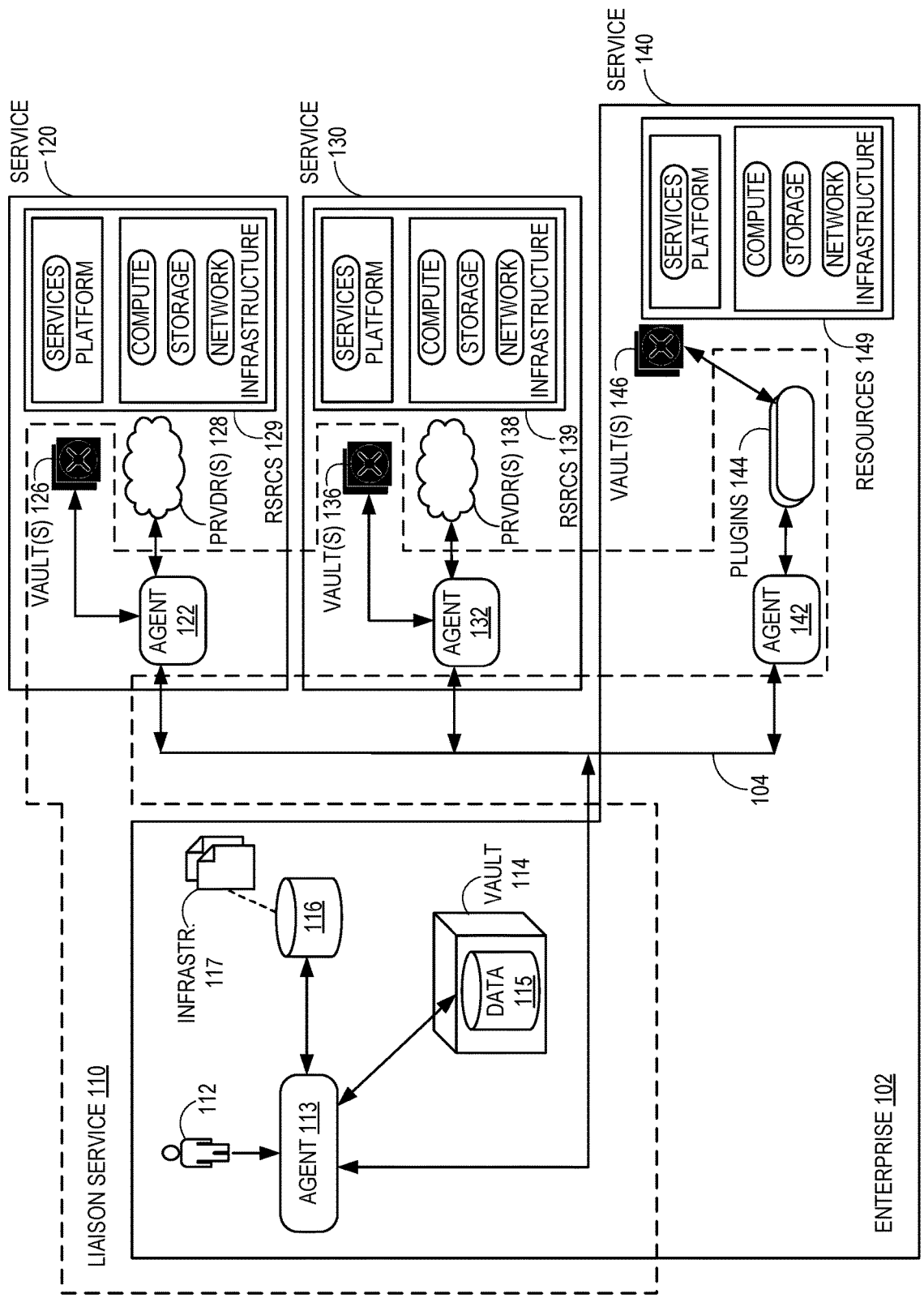
FIG. 1 illustrates an arrangement for providing computing resource services with the assistance of a liaison service, according to embodiments of the present invention.

Embodiments of the present invention provide computing resource arrangements such as shown in FIG. 1, which are applicable for computing resource services 120 and 130 and which may be cloud services, for example. Enterprises, such as enterprise 102, may have arrangements disclosed herein as a uniform way of requesting/accessing computing resource provider(s) 128, 138, etc. to perform IT operations, such as requesting a virtual machine, etc. of resources 129, 139, etc.

In the example of FIG. 1, a user 112 has access to computer system resources 149 controlled by enterprise 102. In an embodiment of the present invention, access to resources 149 may be by liaison service 110, which includes user agent 113 (may also be referred to as liaison agent 113 herein), user password vault 114 (may also be referred to as internal vault 114 herein), metadata 115, database 116 and other information technology infrastructure 117. Agent 113 may run on a computer system that is included among the computer system resources controlled by enterprise 102.

User 112 also has access via network 104 to computer system resources of external computing resource service providers, including a first set 120 of resources 129 hosted by external computing resource service provider(s) 128 and a second set 130 of resources 139 hosted by external computing resource service provider(s) 138, where liaison service 110 provides a resource agent 122 (may also be referred to as vault agent 122 herein) for vault(s) 126 for the resources of the first set 120 of computing resources and provides vault agent 132 (may also be referred to as vault agent 132 herein) for vault(s) 136 for the resources of second set 130. The physical resources 129 and 139 are controlled by respective services 120 and 130, not enterprise 102 or user 112.

In an embodiment of the present invention, liaison service 110 includes user agents 113 and 122 and vaults 114 and 126, which enable uniformity of communication between user 112 and service 120 since liaison service 110 configures communication between agents 113 and 122, between agent 113 and vault 114, and between agent 122 and vault(s) 126. In an embodiment, provider(s) 128, 138, etc. add actual credentials and manage the information stored in vault(s) 126, 136, etc., not liaison service 110.

In an embodiment of the present invention, the provider of internal enterprise service 140 configures vault(s) 146, whereas resource agent 142 (may also be referred to as vault agent 142 herein) is provided and configured by the liaison service 110. To facilitate this arrangement, service plug-ins 144 shown in FIG. 1 provide interface(s) between vault(s) 146 and vault agent 142. Also, liaison service 110 stores a plug-in identifier in vault 114, so that when user 112 requests a resource 149, agent 113 sends this plug-in identifier to agent 142 to identify a particular service plug-in 144 for communication between agent 142 and a corresponding one of vault(s) 146. Use of such a plug-in 144 enables vault agent 142 to use the same uniform data exchange with a selected vault 146 that agents 126 and 132 use with vault(s) 126 and 136, even though the selected vault 146 is not provided and configured by the liaison service 110 and may not be the same kinds as vault(s) 126 and 136. (Various kinds of vaults are commercially available, such as vaults by Hashicorp and Cyber-arc.) In an alternative embodiment of the present invention, liaison service 110 may configure vault(s) 146.

In another embodiment of the present invention, resource provider(s) 128 and 138 of services 120 and 130 are provided and configured independently of the liaison service 110 and its agents 113, 122 and 132 and vaults 114, 126 and 136, but the liaison service 110 does at least configure its agents 113, 122 and 132 and vaults 114 and 126. In this arrangement, there is no need for plug-ins to ensure uniformity of communication, since liaison service 110 configures agents 113, 122 and 132 and vaults 114, 126 and 136. In general, plug-ins may be provided in embodiments where vaults are configured and controlled by a different entity than (i.e., independently of) whatever entity configures and controls agents. In an alternative embodiment, plug-ins may be provided for external services 120, 130, etc.

User 112 accesses the resources of services 120 and 130 via network 104. User 112 also has access via network 104 to resources 149 of internal enterprise service 140, where service 140 may or may not be controlled by enterprise 102, including at the home of the user 112, for example. Service 140 provides resources 149 that may include a portable laptop of user 112, for example, which may be located wherever the user chooses to be, of course. Liaison service 110 provides a vault agent 142, external vault plug-ins 144 for communicating with computer resource service 140 whereas vault(s) 146 may be owned, controlled and operated by the enterprise of user 112 or controlled by an enterprise remote from enterprise 102, according to an embodiment of the present invention.

Figure 4:
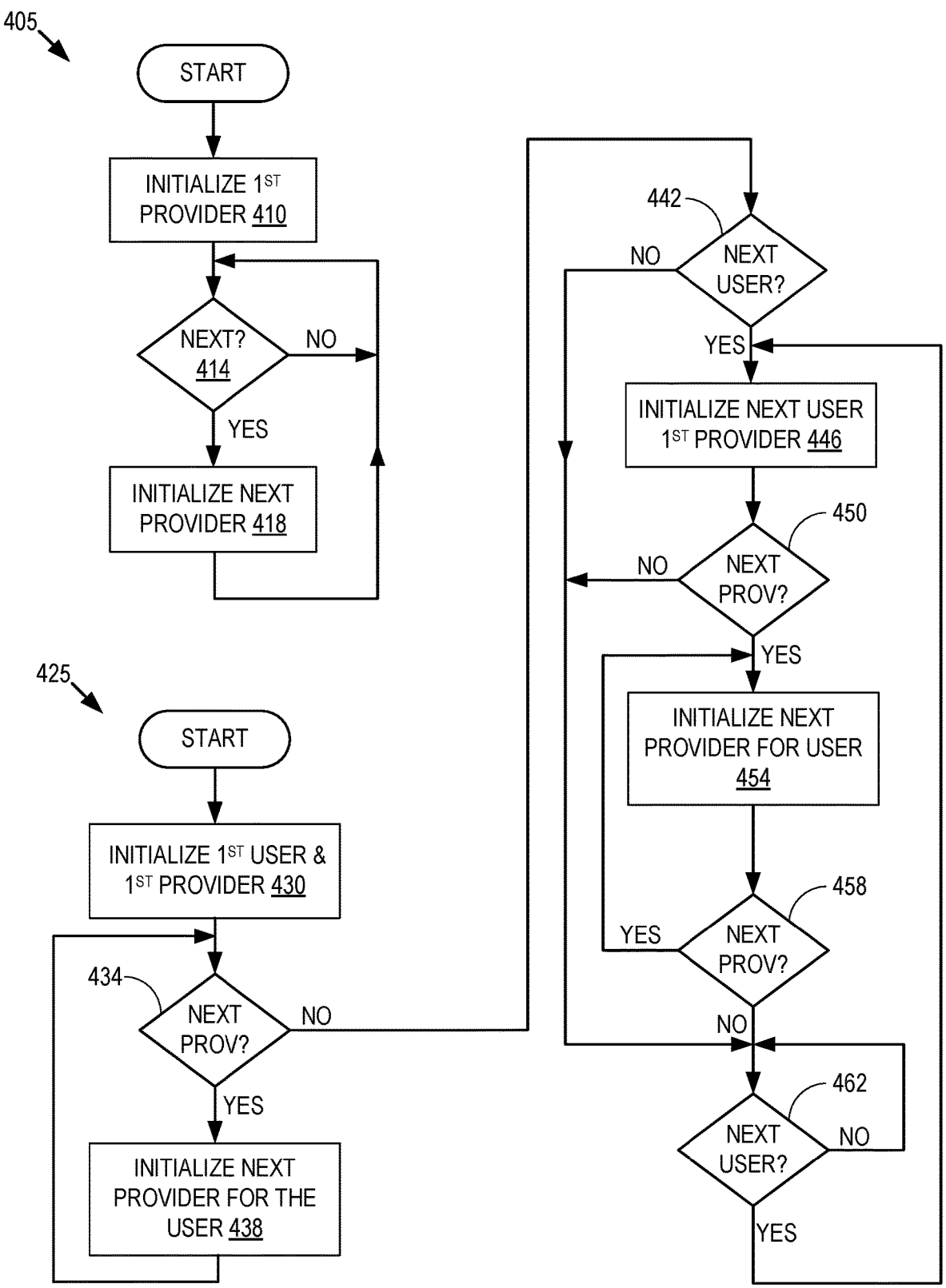
FIG. 4 illustrates a liaison service process for initializing resource providers and users, according to an embodiment of the present invention.
Figure 5:
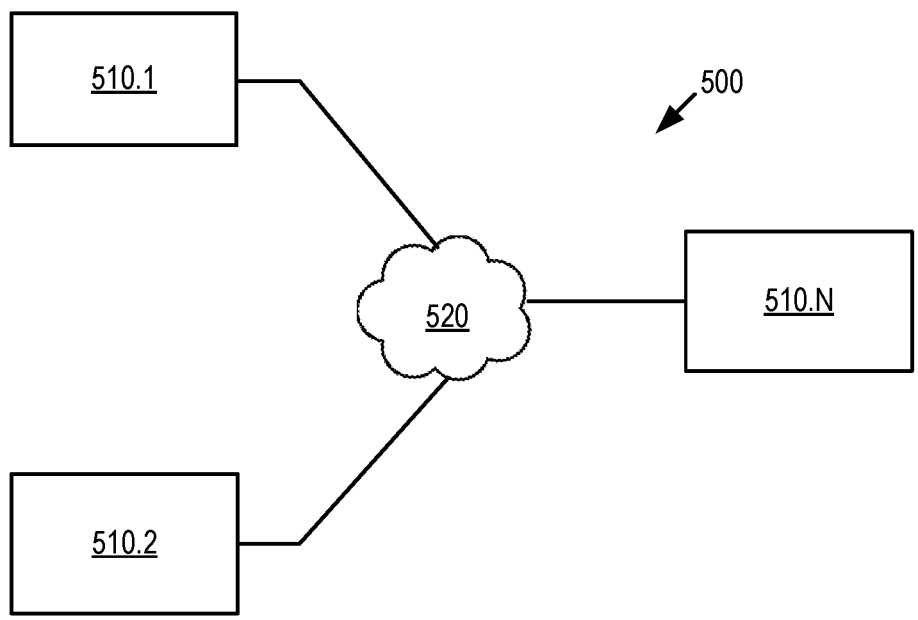
FIG. 5 illustrates a networked computer environment, according to embodiments of the present invention.

Referring now to FIG. 4, a process 405 for initializing liaison service 110 for resource provider(s) 128 of service 120 is illustrated, according to an embodiment of the present invention. The description of process 405 below is an example for service 120, but it will be understood that process 405 applies for others, such as services 130 and 140.

As an example, process 405 is shown in FIG. 4, wherein liaison service 110 for computing resource service 120 initializes 410 data and processing entities for a first resource provider 128 of service 120, which includes liaison service 110 deploying agent 122 and first vault 126 for provider 128, wherein liaison service 110 establishes and appropriately stores identifiers, credentials, network addresses, etc., for entities associated with service 120, i.e., data shown in Table 1 and FIG. 1, which includes identifiers for first vault 126 and first provider 128, password for agent 122 to access first vault 126, etc.

Then, at 414, liaison service 110 checks to see if there is another resource provider for service 120. If yes, liaison service 110 initializes 418 data and processing for next provider, provider 128 of service 120, including next vault 126 and identifiers, credentials, network addresses, etc., for service 120 entities, i.e., data shown in Table 1 and FIG. 1, which includes identifiers for next vault 126 and next provider 128, password for agent 122 to access next vault 126, etc. If no at 414, liaison service 110 branches back to wait for a next provider to be added, at which point liaison service 110 will initialize the next provider at 418, etc.

In embodiment of the present invention, a user needs only a single account for all the resource 129 provider(s) 128 of computing resource service 120, for example. For such an arrangement, a process like process 405 for resource providers initializes liaison service 110 for users of service 120 in the same fashion, but for users instead of resource providers. Alternatively, when each user has accounts for respective ones of the providers 128 of service 120, a process 425 initializes liaison service 110 for users of service 120 as shown in FIG. 4 for an embodiment of the present invention. (The description of process 425, below, is an example for users of computing resource 120, but it will be understood that process 425 applies for other computing resources, such as computing resource service 130, and for other services, such as internal enterprise service 140.)

At 430 in process 425, liaison service 110 initializes an account for user 112 in response to a user 112 request for liaison service 110 from a first one of computing resource service 120 provider(s) 128. This includes liaison service 110 deploying agent 113 and vault 114 for enterprise 102, and establishing identifiers, credentials, network addresses, etc., for entities associated with user 112 and enterprise 102 as shown in the data of Table 1 and FIG. 1, which includes account identifier for user 112, vault identifier for vault 114, password for agent 113 to access vault 114, etc., and includes establishing secure, private communication between agents 113 and 122.

Next, liaison service 110 checks at 434 to determine if the same user 112 is requesting service from another provider 128 of service 120. If there is a request from user 112 for service from a second one of the provider(s) 128, liaison service 110 does not need to deploy any additional agent 113 or vault 114, but liaison service 110 does, at 438, initialize service for the second provider 128 for the user 112 by establishing and storing, which may be via agent 113, any additional identifiers, credentials, network addresses, etc. that are needed, which may include another account identifier for user 112 associated with second provider 128, identifier for the second provider 128, etc., i.e., relevant data as shown in Table 1. Next, liaison service 110 returns to 434 and checks again to determine if the same user 112 is requesting service from a third provider 128 of computing resource service 120, and so on.

Once liaison service 110 determines at 434 that user 112 has no more provider 128 initialization requests, liaison service 110 checks at 442 for a second user requesting service from a first provider 128. For any such subsequent request from a second user for service from a first one of the provider(s) 128, liaison service 110 does not need to deploy any additional agent 113 or vault 114, but does initialize service at 446 for the second user by establishing any additional identifiers, credentials, network addresses, etc. that are needed, which may include another account identifier for the second user associated with first requested provider 128 for the second user, identifier for the requested provider 128, etc., i.e., relevant data as shown in Table 1.

Next, liaison service 110 checks at 450 to determine if the second user is requesting service from a second provider 128 of computing resource service 120. If no at 450, then liaison service 110 branches to continue checking at 462 until another user requests initial liaison service 110. If yes at 450, then once again liaison service 110 does not need to deploy any additional agent 113 or vault 114, but does initialize service at 454 for the second provider 128 for the second user by establishing any additional identifiers, credentials, network addresses, etc. that are needed, which may include another account identifier for the second user associated with requested second provider 128 for the second user, identifier for the requested provider 128, etc., i.e., relevant data as shown in Table 1. Next, liaison service 110 checks at 458 to determine if the same user is requesting service from a third provider 128 of service 120, and branches again to 454 if yes, or else to 462 if not, and so on.

User 112 uses, via liaison service 110, respective credentials for the user to access resources 129, 139 and 149 of services 120, 130 and 140, where the respective credentials are stored in the respective vault(s) 126, 136 and 146. (Such a vault may also be known as a "credential store"). The respective credentials remain as secret credentials in vault(s) 126, 136 and 146 and are not sent to the computer system resources of enterprise 102, according to an embodiment of the present invention. (Besides the credentials, vault(s) 126, 136 and 146 may include configuration info—also known as "provisioning" info.) To access the credentials of user 112 in respective vault(s) 126, 136 and 146, agent 113 uses uniform credentialing data structures and communication for the user, such as described herein.

Regarding liaison agent 113 communication for user 112 via normalized (i.e., uniform) data structures for protection of credentials (i.e., not sending certain credentials to computer system resources 117 controlled by enterprise 102 of user 112, while indirectly providing those credentials to resources 129 of external computing resource service provider(s) 128, for example, to enable access by user 112 to resources 129), the following provides further details of such communication via normalized data structures for both protection and use of secret credentials required to access resources 129 and 139 of computing resources 120 and 130, according to embodiments of the present invention.

Conventionally, computing resource providers secure secret credentials in vaults that are managed by them. For example, in conventional arrangements, a provider keeps secret credentials in a vault protected by firewall/other operating controls on the premises of the computing resource provider, where the provider imposes full control over the handling of the credentials. Conventionally, computing resource providers may not even disclose the structure of the secret credentials. This is in contrast to an embodiment of the present invention shown in data flow diagram of FIG. 2, for example, wherein liaison service 110 stores meta-data 115 in vault 114 for enterprise 102 of user enterprise, where meta-data 115 defines credentials that indirectly enable user 112 to access computing resource provider(s) 128, 138, etc., and where meta-data 115 in vault 114 is not subject to computing resource provider 128 and 138 ownership, operation and control that is conventionally required for accessing private vault(s) 126 and 136 of computing resource provider(s) 128 and 138. Further, in an embodiment of the present invention, the meta-data 115 in vault 114 defines and conforms to a normalized, i.e., uniform, structure that includes values and human-readable tags describing the values, such as JavaScript Object Notation ("JSON") format shown in FIG. 2 and Table 1. Since liaison service 110 is a service that may be widely deployed to access resources 129, 139 and 149, for example, of more than one provider, communication and data structures for liaison service 110 are likewise normalized to provide communication that is compatible with an array of different computing resource services 120, 130, and 140.

Each computing resource provider—for example, computing resource provider 128 for computing resource service 120—keeps secret credentials in its own vault(s) 126 for accessing its resources 129, where each vault 126 is provided, configured and controlled by liaison service 110 for a respective provider 128, whereas provider 128 has the ability to revoke the credentials, for example. Agent 113 may fetch meta-data 115 in vault 114, but not the secret credentials in vault 126. Meta-data 115 includes at least a name of the secret credentials and a UUID reference that enables agent 113 to request agent 122 of provider 128 to fetch the secret credential, e.g., password, from vault 126. In general, meta-data 115 includes everything that is needed for agent 122 to fetch the secret credential from vault 126. The meta-data 115 credentials are not necessarily exclusive credentials for user 112 but may be shared API keys for use by more than one user, such as a team, so that any team member can use them to access resources 129 of computing resource service 120, for example.

For example, user 112 orders a particular resource, such as a stack, i.e., a virtual machine, which is a resource 129 of computing resource service 120, such as an Amazon computing resource, for example. The request is processed by liaison service 110, wherein agent 113 fetches the details of a team to which user 112 belongs and fetches the account to use, such as in database 116. Then agent 113 looks in local vault 114 and determines from meta-data 115 therein that the actual credentials required are in vault 126. Agent 113 passes the meta-data 115 from local vault 114 to agent 122, which uses meta-data 115 to read the secret credentials from vault 126. Resource agent 122 uses the secret credentials from vault 126 to invoke AWS to order API's to create a virtual machine. Note that vault agents 122, 132 and 142 can be on the premises of the respective services 120, 130, and 140.

Figure 2:
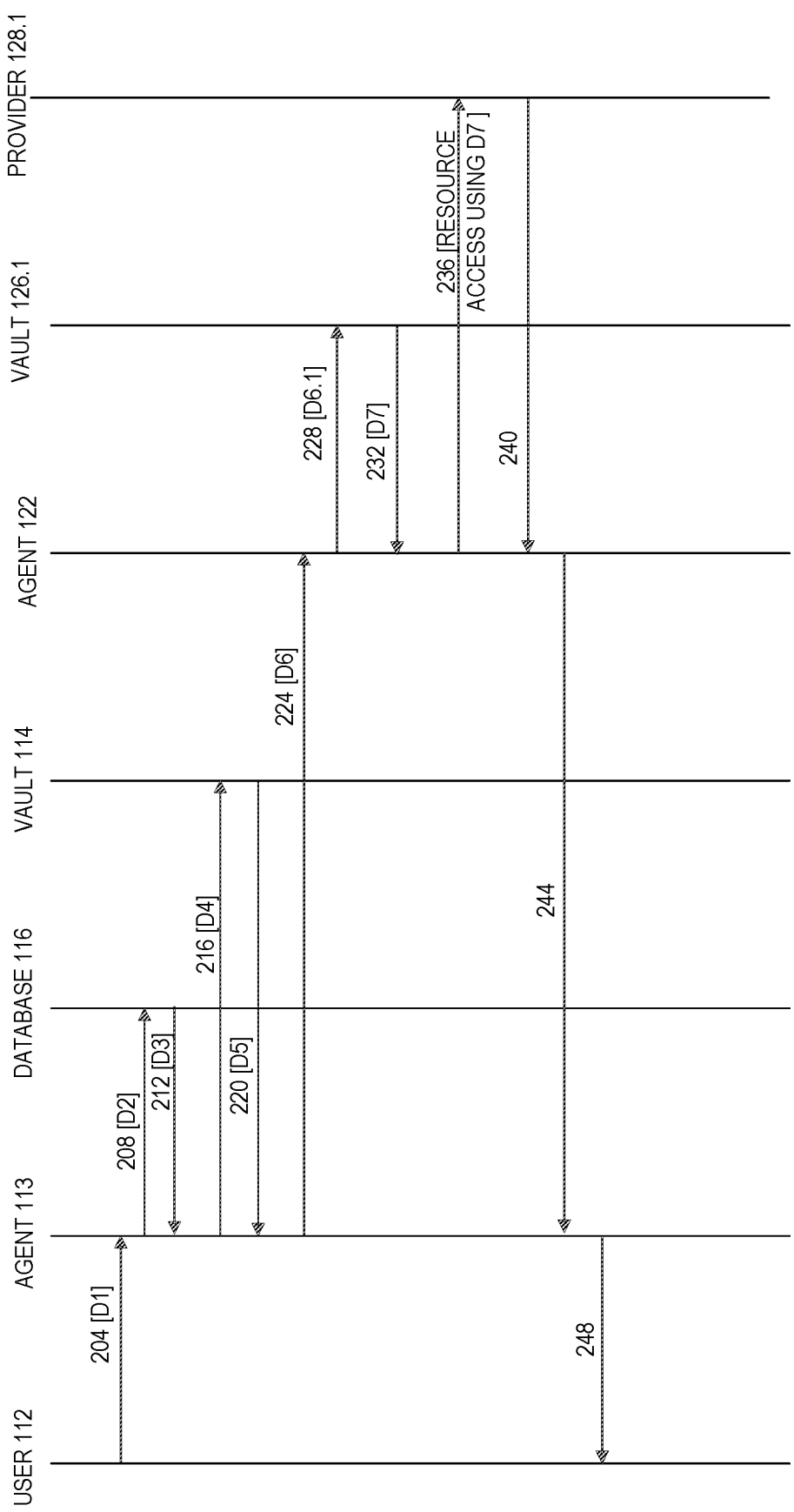
FIG. 2 provides a data flow diagram that illustrates communication among entities of FIG. 1, according to embodiments of the present invention.

To provide more specific detail for a transaction such as the one described above, the following describes uniform communication and data structure shown in Table 1 herein below and FIG. 2 for a transaction that includes communication of liaison agent 113 with user 112, internal vault 114, and agent 122, as an example, according to an embodiment of the present invention. In the example transaction, user 112 sends a request 204 for agent 113 to access a resource of a particular first service provider 128 among provider(s) 128 in computing resource service 120, where the request includes data D1 shown in Table 1, i.e., i) account info for user 112 or a team of user 112, including account name and account ID, ii) identifier and name for a first resource 129 that user 112 requests, iii) code or other identifier for a provider 128 of first resource 129 and iv) identifier of provider 128 of computing resource service 120 that includes the first resource 129 provider 128. Data D1 includes data that liaison service 110 provided to user 112 in connection with setting up service for user 112 with computing resource service 120, provider 128, first resource 129, etc.

In response to request 204, agent 113 forwards items iii) and iv) of request 204 as query 208 to database 116, seeking meta-data 115 that identifies details of the requested provider 128 and first service provider 128. See data D2 shown in Table 1. Also, in response to request 204, agent 113 forwards user 112 (or team) account identifier from request 204 to local vault 114 as a request 216 for additional credentials needed to access the first computing resource provider 128 resource identified in request 204. See data D4 shown in Table 1.

In response to query 208, database 116 returns query result 212 to agent 113. Result 212 provides data D3 shown in Table 1, which includes names for computing resource provider 120 and first service provider 128, a URL that provides an address for accessing resource agent 122 of service 120 and a vault ID for a particular first vault 126 corresponding to first service provider 128, which is one among a number of vault(s) 126 for service 120. These items of data D3 are data items that liaison service 110 stored in database 117 when setting up user 112 with service 120, first provider 128, first resource 129, etc., where liaison service 110 stored the items of data D3 in database 117 in association with a code or other identifier for a first provider 128 of first resource 129 and in association with an identifier of computing resource provider 128 of service 120 that has the first resource 129 provider 128.

Query result 212 data D3 also includes items iii) and iv) that were included in the query 208 of database 117 by agent 113, which agent 113 uses to match result 212 to query 208, i.e., enabling agent to determine that result 212 is a reply to query 208.

In response to request 216, vault 114 sends reply 220 to agent 113. See data D5 shown in Table 1. Reply 220 includes credentials that agent 113 needs to initiate agent 122 fetching private credentials kept as a secret by first computing resource provider 128. Specifically, according to the illustrated embodiment, vault 114 reply 220 provides data D5 shown in Table 1, which authenticates agent 113 to agent 122 and provides access information needed by computer recourse agent 122, including a credential name and a credential key identifier that agent 122 will forward. (These items of data D5 are data items that agent 113 earlier obtained from agent 122 and stored in vault 114 in connection with setting up service for user 112 with service 120, first provider 128, first resource 129, etc.)

Data D5 of reply 220 also includes the account name and account ID that were provided to agent 113 by user 112 in data D1 of request 204 and the vault ID that was provided to agent 113 by database 117 in data D3 of query result 212, which agent 113 uses to match reply 220 to request 216, i.e., enabling agent to determine that reply 220 is a reply to request 216.

The credential name and credential key identifier received in data D5 of reply 220 are forwarded in a request 224 (shown in data D6 of Table 1) by agent 113 to agent 122, so that agent 122 may use the credentials to fetch private credentials from first vault 126 (i.e., private credentials shown in Table 1 herein below as data D7). (In turn, the private credentials it fetches from first vault 126 will enable agent 122 to access first resources 129 of first computing resource provider 128.) In data D6 of request 224, agent 113 also includes all the data D1 that agent 113 received in request 204 from user 112.

Agent 113 addresses request 224 to a particular one of the agents 122, 132 and 142, i.e., the agent that controls the resource indicated in request 204 of user 112 (agent 122 in the present example) via information that agent 113 includes in a header for request 224. Specifically, agent 113 includes in a header of request 224 the resource agent 122 URL it received from database 117, which provides an address for agent 122 of computing resources service 120. Likewise, in the header for request 224 agent 113 includes a computing resources agent access key for the correct one of agents 122, 132 and 142. Specifically, agent 113 includes the resource agent access key it received from database 117 in query result 212, which is the correct key for agent 122 in the present example. Agent 122 uses the received resource agent access key to authenticate agent 113.

Further, agent 113 includes data in the header of request 224 that indicates the requested resource, i.e., first resource 129 in the present example. Specifically, in the header of request 224 to agent 122, agent 113 sends the vault ID that agent 113 received from database 117. The vault ID directs agent 122 to the vault that is the one dedicated to the requested first resource 129, i.e., first vault 126 in this example.

In response to request 224, resource agent 122 sends a request 228 (shown in data D6.1 of Table 1), which it directs to first vault 126 of first computing resource provider 128 based on the vault ID, where the request 228 is for a private key that agent 122 needs to authenticate user 112 with first provider 128. To access first vault 126, agent 122 uses the credential name and credential key identifier it received from agent 113 in request 224.

In response to request 228, given that it includes the credential name and key identifier forwarded by agent 113 and agent 122, resource agent 126 sends the private key from first vault 126 to first provider 128 in data D7 of request 232. (Communications for data of Table 1 shown in FIG. 2 prior to transaction 232 are create, update and destroy operations that involve only meta-data, i.e., data about or related to a private credential stored in a vault 126 or 136 that a service provider 128, 138 directly accesses, but not the private credential, itself. Reply 232, however, fetches the private credential from first vault 126.)

First provider 128 grants access for user 112 to first resource 129 based on the private key in request 232, where the granting of access may be via communications 240, 244 and 248, as shown.

Figure 3:
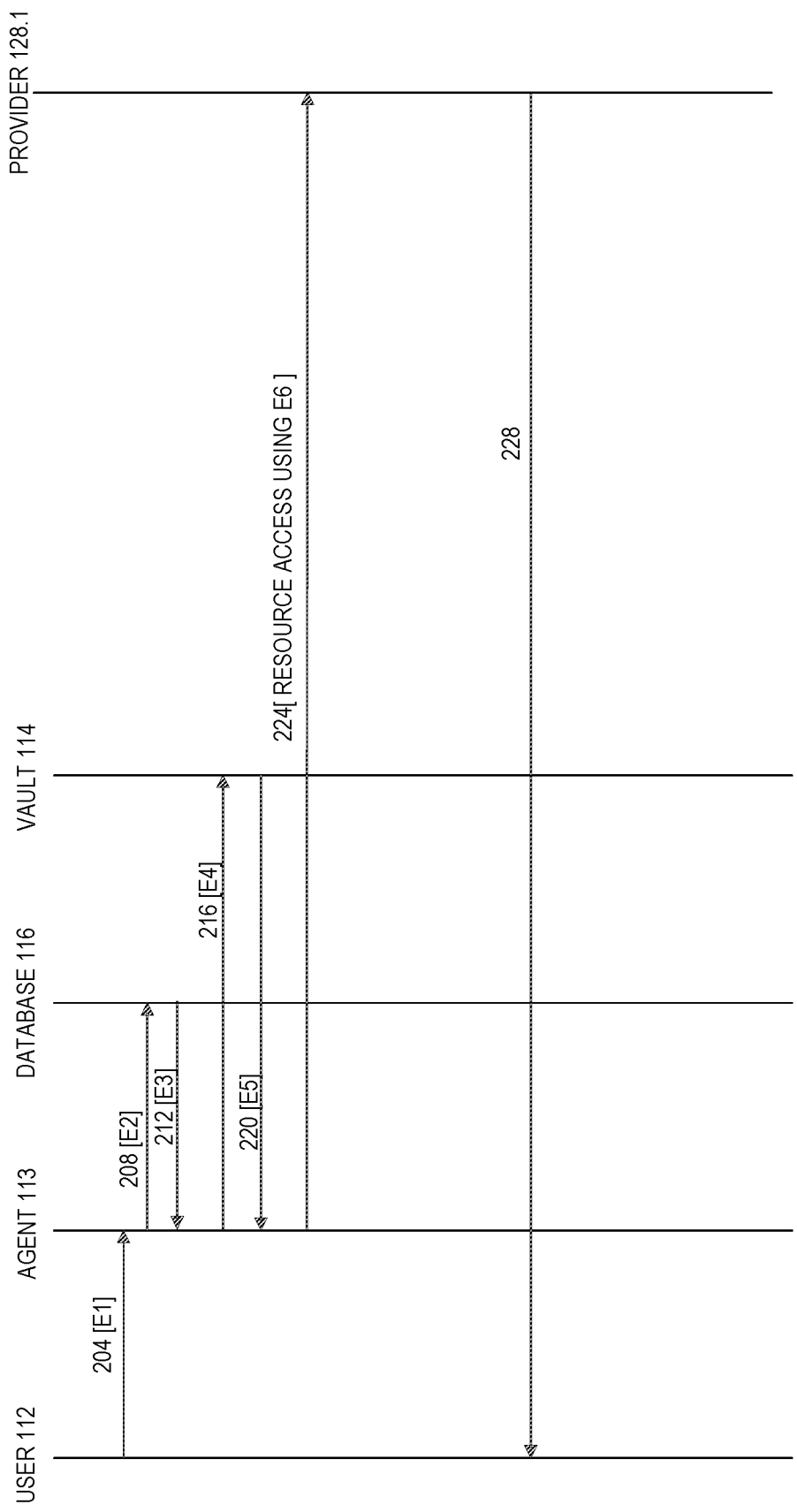
FIG. 3 illustrates a data flow diagram, according to embodiments of the present invention.

It should be understood that, although FIG. 3 and its description above concern communication and data structures for access by a user 112 to resources of service 120, the same types of data elements and formats apply for access by user 112 to other services, such as service 130, for example.

TABLE ONE

```
[D1]
{
        "cloudProviderInfo" : {
           "cloudProviderID" : "", // 128
        },
        "resourceInfo" : {
                "serviceProviderCode" : "<serviceProviderCode>", // uniquely defines cloud service provider - 128
                "resourceName" : "resourceName",
                "resourceID" : "<UUID>" // resource of cloud service provider 128
        },
        // Need credentials for below account
        "accountInfo" : {
                "accountName" : "<accountName_1>",
                "accountID" : "<UUID>"
        }
}
[D2]
{
        "cloudProviderInfo" : {
                "cloudProviderID" : "", // cloud service provider - 128
                "serviceProviderCode" : "<serviceProviderCode>", // uniquely defines cloud service provider - 128
```

TABLE ONE-continued

```
        }
    }
[D3]
{
    "cloudProviderInfo" : {
        "cloudProviderName" : "",
        "cloudProviderID" : "",
        "vaultAgentURL" : "<URL>",  // vault agent 122
        "serviceProviderInfo" : {   // cloud service provider info for 128
            "serviceProviderName" : "<serviceProviderName>",
            "serviceProviderCode": "<serviceProviderCode>",
            "vaultID" : "<vaultUUID>"  // uniquely defines the vault to use - 126
        },
    }
}
[D4]
{
    // Fetch meta data from the vault114
    "accountID" : "<accountUUID>"
}
[D5]
// response info on how to access vault - 126
{
    "vaultID" : "<vaultUUID>"  //e.g. ID for Vault  126,
    "vaultAgentAccessKey" : "<authentication header to call agent 122>",
    "accountInfo" : {
        "accountID" : "<accountUUID>",
        "accountName" : "<accountName_1>",
        "credentialInfo" : {
            "credentialName" : "CREDENTIAL NAME",
            "key" : "<UUID>"  // identifier for key stored in the cloud provider 128's first
vault 126
            //No actuall password in here.
        }
    }
}
[D6]
{
    D1 +
    "credentialInfo" : {
        "credentialName" : "CREDENTIAL NAME",
        "key" : "<UUID>"  // identifier for key stored in the cloud provider 128's   vault
126
        //No actuall password in here.
    }
}
[D6.1]
{
    "key" : "<UUID>"  // identifier for key stored in the cloud provider 128's   vault 126
}
[D7]
// Response from  vault 126 to agent 122
{
    "password_fields" : {
        "key1" : "<SECRET-1>",
        "key2" : "<SECRET-2>"
    }
}
```

Aspects of another embodiment of the present invention, are shown in data flow diagram of FIG. 3 and in the data of Table 2, with regard to secret credentials required to access resources 129 and 139 of computing resources services 120 and 130, for example. According to this embodiment, computing resource provider(s) 128 and 138 allow liaison service 110 to store the secret credentials in internal vault 114 for a user enterprise 102.

TABLE TWO

```
[E1]
{
    "cloudProviderInfo" : {
        "cloudProviderID" : "",  // 128
    },
    "resourceInfo" : {
        "serviceProviderCode" : "<serviceProviderCode>",  // uniquely defines cloud service
provider - 128
        "resourceName" : "resourceName",
        "resourceID" : "<UUID>"  // resource of cloud   service provider 128
    },
```

TABLE TWO-continued

```
        // Need credentials for below account
        "accountInfo" : {
                "accountName" : "<accountName_1>",
                "accountID" : "<UUID>"
        }
}
[E2]
{
        "cloudProviderInfo" : {
                "cloudProviderID" : "", // cloud service provider - 128
                "serviceProviderCode" : "<serviceProviderCode>", // uniquely defines cloud service
provider - 128
        }
}
[E3]
{
        "cloudProviderInfo" : {
                "cloudProviderName" : "",
                "cloudProviderID" : "",
                "vaultAgentURL" : "<URL>", // vault agent 122
                "serviceProviderInfo" :   { // cloud service provider info for 128
                        "serviceProviderName" : "<serviceProviderName>",
                        "serviceProviderCode": "<serviceProviderCode>",
                        "vaultID" : "<vaultUUID>" // vault to use - 114
                },
        }
}
[E4]
{
        // Fetch meta data from the vault114
        "accountID" : "<accountUUID>"
}
[E5]
// response info from internal vault
{
        "vaultID" : "<vaultUUID>" //eg ID for Vault 114,
        "accountInfo" : {
                "accountID" : "<accountUUID>",
                "accountName" : "<accountName_1>",
                "credentialInfo" : {
                        "credentialName" : "CREDENTIAL NAME",
                        "password_fields" : {
                                "key1" : "<SECRET-1>",
                                "key2" : "<SECRET-2>"
                        }// stored in the internal vault 114
                        //actual password in here.
                }
        }
}
[E6]
{
        [E1] +
        "password_fields" : {// received from D5.credentialInfo.password_fields
                "key1" : "<SECRET-1>",
                "key2" : "<SECRET-2>"
        }
}
```

In an embodiment of the present invention described herein above, a user requests access to a resource of a computing resource service via an agent of the user. Fetching of a credential that ultimately permits accessing the resource is deferred to an agent of the resource provider, where the user agent is for the user, whereas the resource provider agent is for the computing resource, where the computing resource is at a different location than the user in one embodiment of the present invention.

It should be appreciated that embodiments of the present invention, as disclosed, provide advantages regarding controlling credentials by limiting the fetching of each resource provider's private, i.e., secret, credentials solely to an agent 122 for a computing resource service 120 of the resource provider(s) 128, for example. In an embodiment, secret credentials of each resource provider 128 are kept in a respective password vault 126 of a computer system accessible storage device, which is at the same physical location of the computing resources of the service 120 and resource provider(s) 128 in one embodiment of the present invention, and is not at the same location in another embodiment. Although the liaison service 110 may provide configuration and connection information to the vault(s) 126 of respective ones of the resource provider(s) 128, the respective password vault(s) 126 are, in one embodiment of the present invention, in the computer system(s) controlled by the respective providers 128, where the computer system(s) is(are) protected and independently managed by each respective resource provider 128.

Further, regarding the resource provider 128 secret credentials that it fetches from the resource provider's vault 126, the resource agent 122 is only permitted to send the credentials to the resource provider 128, which is at the same location as the vault 126, so that the resource agent 122 does not send the secret credentials to another location, such as to a user 112 or user's agent 113, for example. It is an advantageous aspect of this arrangement in embodiments of the present invention that an attack surface is reduced, as compared to permitting a user or an independent brokering service to directly access the secret credentials that can be used to directly access the resources of the resource provider. Further, this arrangement in embodiments of the present invention enables the resource provider 128 to revoke access of the user's agent 113 or the resource agent 122 to the credentials in vault 126 without necessarily revoking the credentials themselves in the resource provider's vault 126.

It should be appreciated from the present disclosure that authentication communication between the user and the computing resource services is solely via the communicating by the liaison service between the user and the computing resource services. The user does not communicate directly with the computing resource services to authenticate the requests by the user. It should also be appreciated that the user does not obtain a key for authenticating the user with the first computing resource service and does not obtain to a key for authenticating the user with the second computing resource service.

Further, it is another aspect of what is disclose herein that the liaison service receives a first request from the user requesting access to the first computing resource service and a second request from the user requesting access to the second computing resource service. The first request from the user has types of predetermined data elements in a predetermined format and the second request from the user has the same predetermined types of data elements in the same predetermined format.

In a further aspect, the initializing first and second computing resource services for the user by the liaison service includes storing, by the liaison service, in first and second resource password vaults for the respective first and second computing resource services, respective first and second computing resource keys, the first computing resource key being stored in the first resource password vault in association with the first computing resource key identifier and the second computing resource key being stored in the second resource password vault in association with the second computing resource key identifier. The first computing resource service is configured for granting access to resources of the first computing resource responsive to the first computing resource key and the second computing resource service is configured for granting access to resources of the second computing resource responsive to the second computing resource key.

In another aspect, providing computing resources to a user includes retrieving the first computing resource key identifier from the user password vault responsive to the first account identifier and retrieving the first computing resource key from the first computing resource password vault responsive to the first computing resource key identifier.

In a further aspect, the first computing resource key identifier is retrieved from the user password vault by a user agent of the liaison service responsive to the user agent receiving the first account identifier in a request from the user for access to the first computing resource service. Providing computing resources to the user includes sending, via a network by the user agent, the first computing resource key identifier to a first resource agent of the liaison service for the first computing resource service. The first computing resource agent retrieves the first computing resource key from the first resource password vault responsive to the first resource agent receiving the first computing resource key identifier from the user agent.

Figure 6:
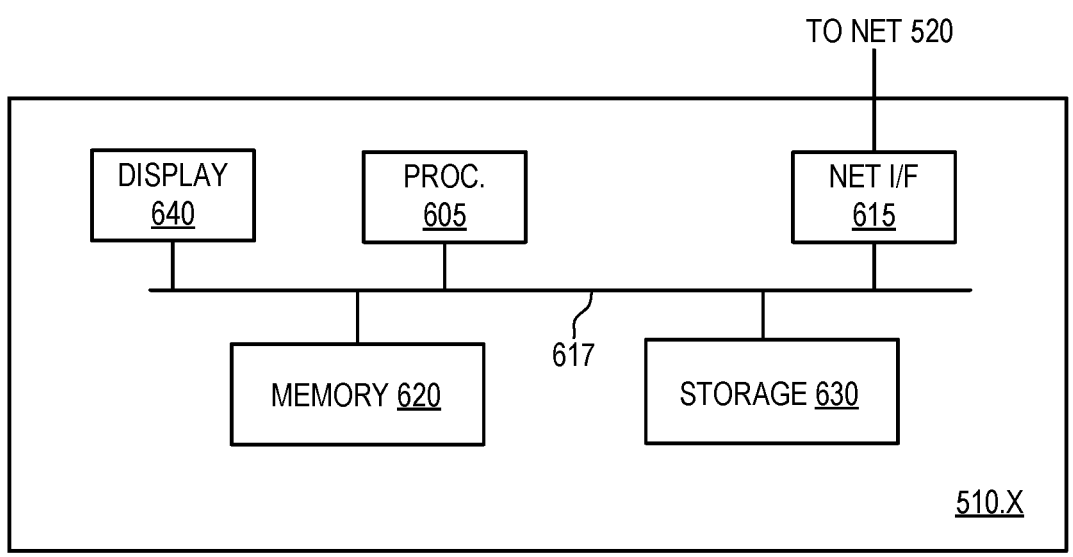
FIG. 6 is a block diagram of devices shown in FIG. 5, according to embodiments of the present invention.

FIG. 6 illustrates an example computing environment 500, according to embodiments of the present invention. As shown, computing environment 500 includes computer systems 510.1, 510.2 through 510.N connects via network 520, which may be public or private. Systems 510.1, 510.2, etc. include modules, which may be program or hardware modules, configured to perform tasks for their own respective systems or for other systems or both.

Figure 7:
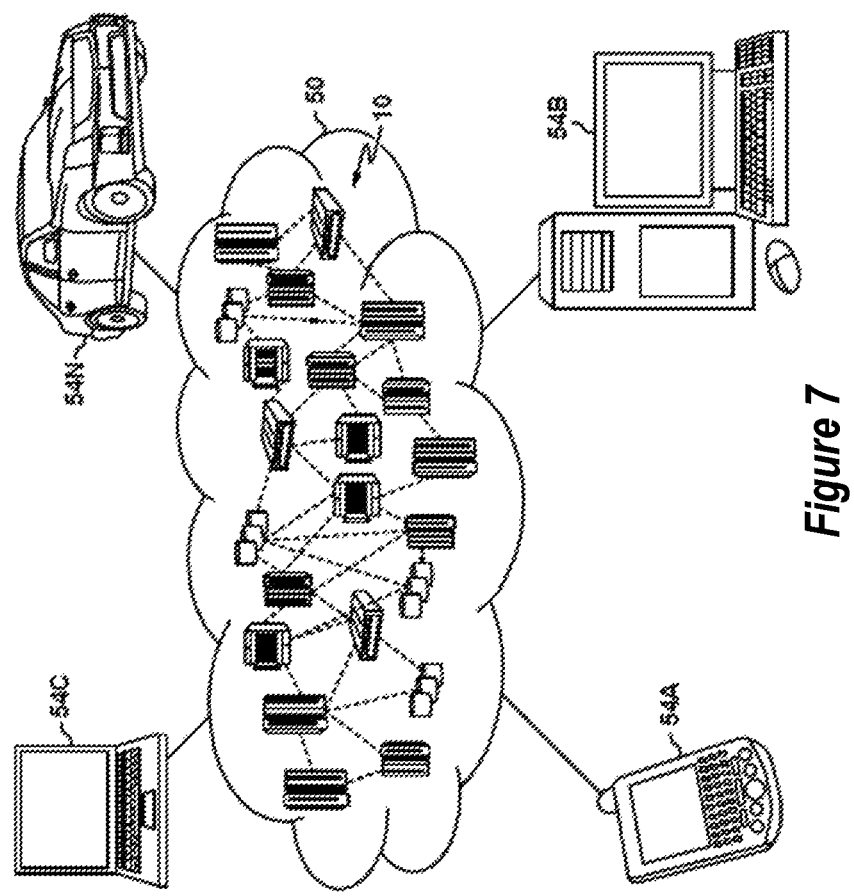
FIG. 7 depicts a cloud type of computing resource environment, according to embodiments of the present invention.

FIG. 7 illustrates details of a computer system 110.X suitable as computer systems 510.1, 510.2, etc. according to embodiments of the present invention, wherein system 110.X includes at least one central processing unit (CPU) 605, network interface 615, interconnect (i.e., bus) 617, memory 620, storage device 630 and display 640 where system 110.X may include an icon management module 260. CPU 605 may retrieve and execute programming instructions stored in memory 620 for applications, including module 260. Similarly, CPU 605 may retrieve and store application data residing in memory 620. Interconnect 617 may facilitate transmission, such as of programming instructions and application data, among CPU 605, storage 630, network interface 615, and memory 620. CPU 605 is representative of a single CPU, multiple CPUs, a single CPU having multiple processing cores, and the like. Additionally, memory 620 is representative of a random access memory, which includes data and program modules for run-time execution, such as model builder 103, according to embodiments of the present invention. It should be understood that system 110.X may be implemented by other hardware and that one or more modules thereof may be firmware.

It is to be understood that although this disclosure includes the following detailed description of cloud computing, implementation of the teachings recited herein are not limited to a cloud computing environment. Rather, embodiments of the present invention are capable of being implemented in conjunction with any other type of computing environment now known or later developed.

A cloud computing model of service delivery may include at least five characteristics, at least three service models, and at least four deployment models.

Characteristics for a cloud computing model are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models for cloud computing are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models for cloud computing are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling computing resources.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
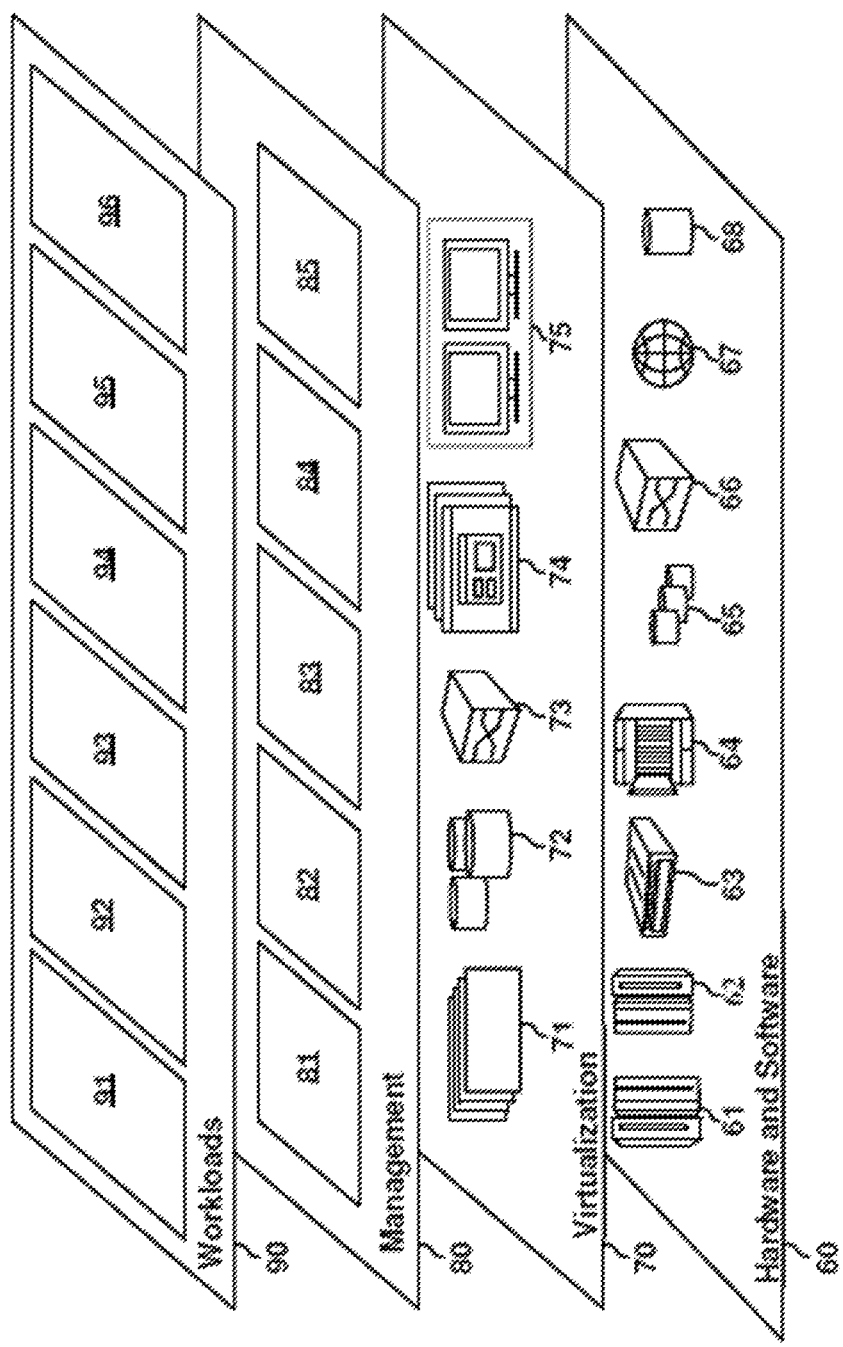
FIG. 8 depicts abstraction model layers applicable to a could type of computing resource model, according to embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91, software development and lifecycle management 92, virtual classroom education delivery 93, data analytics processing 94, transaction processing 95, and providing computing resources to a user 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Likewise, the actions recited in the claims can be performed in a different order and still achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, no element described herein is required for the practice of the invention unless expressly described as essential or critical.

The corresponding structures, materials, acts, and equivalents of all means or step plus function elements in the claims below are intended to include any structure, material, or act for performing the function in combination with other claimed elements as specifically claimed.

It should be appreciated that the particular implementations shown and described herein are illustrative of the invention and its best mode and are not intended to otherwise limit the scope of the present invention in any way. Other variations are within the scope of the following claims. Many modifications and variations will be apparent to those of ordinary skill in the art without departing from the scope and spirit of the invention. The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description but is not intended to be exhaustive or limited to the invention in the form disclosed.

What is claimed is:

1. A method of providing computing resources to a user, the method comprising:
  initializing, for the user and by a liaison service, first computing resource services, wherein the initializing comprises:
  providing, to the user and via the liaison service, a first account identifier for the first computing resource service;
  storing in association with the first account identifier, by the liaison service and in a user vault, a first computing resource key identifier; and
  storing, by the liaison service and in a first resource vault for the first computing resource service, a first computing resource key in association with the first computing resource key identifier, wherein the first computing resource service is configured for granting access to resources of the first computing resource service responsive to the first computing resource key;
  wherein the method further comprises communicating between the user and the first computing resource service by the liaison service, wherein the communicating authenticates requests by the user for the first computing resource service, including:

retrieving the first computing resource key identifier from the user vault responsive to the first account identifier; and retrieving the first computing resource key from the first resource vault responsive to the first computing resource key identifier.

2. The method of claim 1, wherein authentication communication between the user and the computing resource service is solely via the communicating by the liaison service between the user and the computing resource service to authenticate the requests by the user for the computing resource service.

3. The method of claim 2, wherein the user does not obtain a key for authenticating the user with the first computing resource service.

4. The method of claim 1, comprising:
receiving, by the liaison service, a first request from the user requesting access to the first computing resource service; and
receiving, by the liaison service, a second request from the user requesting access to a second computing resource service, wherein the first request from the user has predetermined data elements in a predetermined format and the second request from the user has the same predetermined data elements in the same predetermined format.

5. The method of claim 1, wherein the retrieving the first computing resource key identifier from the user vault responsive to the first account identifier includes retrieving the first computing resource key identifier from the user vault by a user agent of the liaison service responsive to the user agent receiving the first account identifier in a request from the user for access to the first computing resource service, and wherein the method comprises:
sending, via a network by the user agent, the first computing resource key identifier to a first resource agent of the liaison service for the first computing resource service, wherein the retrieving the first computing resource key from the first resource vault responsive to the first computing resource key identifier includes the first computing resource agent retrieving the first computing resource key from the first resource vault responsive to the first resource agent receiving the first computing resource key identifier from the user agent.

6. A system for providing computing resources to a user comprising:
a processor; and
a computer readable storage medium connected to the processor, wherein the computer readable storage medium has stored thereon a program for controlling the processor, and wherein the processor is operative with the program to execute the program for:
initializing, for the user and by a liaison service, first computing resource services, wherein the initializing comprises:
providing, to the user and via the liaison service, a first account identifier for the first computing resource service;
storing in association with the first account identifier, by the liaison service and in a user vault, a first computing resource key identifier; and
storing, by the liaison service and in a first resource vault for the first computing resource service, a first computing resource key in association with the first computing resource key identifier, wherein the first computing resource service is configured for granting access to resources of the first computing resource service responsive to the first computing resource key;
wherein the wherein the processor is further operative with the program to execute the program for communicating between the user and the first computing resource service by the liaison service, wherein the communicating authenticates requests by the user for the first computing resource service, including:
retrieving the first computing resource key identifier from the user vault responsive to the first account identifier; and
retrieving the first computing resource key from the first resource vault responsive to the first computing resource key identifier.

7. The system of claim 6, wherein authentication communication between the user and the computing resource service is solely via the communicating by the liaison service between the user and the computing resource service to authenticate the requests by the user for the computing resource service.

8. The system of claim 7, wherein the user does not obtain a key for authenticating the user with the first computing resource service.

9. The system of claim 6, wherein the processor is further operative with the program to execute the program for:
receiving, by the liaison service, a first request from the user requesting access to the first computing resource service; and
receiving, by the liaison service, a second request from the user requesting access to a second computing resource service, wherein the first request from the user has predetermined data elements in a predetermined format and the second request from the user has the same predetermined data elements in the same predetermined format.

10. The system of claim 6, wherein the retrieving the first resource key identifier from the user vault responsive to the first account identifier includes retrieving the first computing resource key identifier from the user vault by a user agent of the liaison service responsive to the user agent receiving the first account identifier in a request from the user for access to the first computing resource service, and wherein the processor is further operative with the program to execute the program for:
sending, via a network by the user agent, the first computing resource key identifier to a first resource agent of the liaison service for the first computing resource service, wherein the retrieving the first computing resource key from the first resource vault responsive to the first computing resource key identifier includes the first computing resource agent retrieving the first computing resource key from the first resource vault responsive to the first resource agent receiving the first computing resource key identifier from the user agent.

11. A computer program product for providing computing resources to a user, including a computer readable storage medium having instructions stored thereon for execution by a computer system, wherein the instructions, when executed by the computer system, cause the computer system to implement a method comprising:
initializing, for the user and by a liaison service, first computing resource services, wherein the initializing comprises: providing, to the user and via the liaison service, a first account identifier for the first computing resource service;

storing in association with the first account identifier, by the liaison service and in a user vault, a first computing resource key identifier; and storing, by the liaison service and in a first resource vault for the first computing resource service, a first computing resource key in association with the first computing resource key identifier, wherein the first computing resource service is configured for granting access to resources of the first computing resource service responsive to the first computing resource key;

wherein the method further comprises communicating between the user and the first computing resource service by the liaison service, wherein the communicating authenticates requests by the user for the first computing resource service, including:

retrieving the first computing resource key identifier from the user vault responsive to the first account identifier; and retrieving the first computing resource key from the first resource vault responsive to the first computing resource key identifier.

12. The computer program product of claim 11, wherein authentication communication between the user and the computing resource service is solely via the communicating by the liaison service between the user and the computing resource service to authenticate the requests by the user for the computing resource service.

13. The computer program product of claim 12, wherein the user does not obtain a key for authenticating the user with the first computing resource service.

14. The computer program product of claim 11, wherein the method further comprises:

receiving, by the liaison service, a first request from the user requesting access to the first computing resource service; and receiving, by the liaison service, a second request from the user requesting access to a second computing resource service, wherein the first request from the user has predetermined data elements in a predetermined format and the second request from the user has the same predetermined data elements in the same predetermined format.

15. The computer program product of claim 11, wherein the retrieving the first computing resource key identifier from the user vault responsive to the first account identifier includes retrieving the first computing resource key identifier from the user vault by a user agent of the liaison service responsive to the user agent receiving the first account identifier in a request from the user for access to the first computing resource service, and wherein the method comprises:

sending, via a network by the user agent, the first computing resource key identifier to a first resource agent of the liaison service for the first computing resource service, wherein the retrieving the first computing resource key from the first resource vault responsive to the first computing resource key identifier includes the first computing resource agent retrieving the first computing resource key from the first resource vault responsive to the first resource agent receiving the first computing resource key identifier from the user agent.

* * * * *